US009961066B1

(12) United States Patent
Kitchen et al.

(10) Patent No.: US 9,961,066 B1
(45) Date of Patent: May 1, 2018

(54) METHOD AND APPARATUS FOR LIMITING TRAFFIC RATE TO AN ORIGIN SERVER

(71) Applicant: Cloudflare, Inc., San Francisco, CA (US)

(72) Inventors: David Kitchen, London (GB); Julien Desgats, London (GB); Ben Cartwright-Cox, London (GB); Sam Howson, London (GB); Andrew Galloni, London (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days. days.

(21) Appl. No.: 15/783,587

(22) Filed: Oct. 13, 2017

(51) Int. Cl.
*H04L 29/06* (2006.01)
*G06F 21/33* (2013.01)

(52) U.S. Cl.
CPC ...... *H04L 63/0807* (2013.01); *H04L 63/0884* (2013.01); *H04L 63/108* (2013.01); *H04L 63/1458* (2013.01); *G06F 21/335* (2013.01); *H04L 63/0838* (2013.01)

(58) Field of Classification Search
CPC ............. H04L 63/0807; H04L 63/0838; H04L 63/0884; H04L 63/108; H04L 63/1458; H04L 2463/141–2463/143
See application file for complete search history.

(56) References Cited

U.S. PATENT DOCUMENTS 9,635,043 B1 * 4/2017 Knecht ..................... H04L 9/12
9,680,950 B1 * 6/2017 Knecht ............... H04L 67/2814
9,680,951 B1 * 6/2017 Graham-Cumming . H04L 63/14

* cited by examiner

*Primary Examiner* — Minh Dinh
(74) *Attorney, Agent, or Firm* — Nicholson De Vos Webster & Elliott LLP

(57) ABSTRACT

A method and an apparatus of limiting a rate at which traffic is received at an origin server are described. A first request for a resource at an origin server is received at a proxy server from a client device. A first response that includes a refresh instruction, a first refresh time, and a first cryptographic token that is not valid until a first predetermined time is reached is transmitted to the client device. The refresh instruction is to cause the client device to request the resource after the first refresh time has elapsed. A value of a first counter is incremented. As a result of the refresh instruction a second request for the resource is received from the client device. The second request includes the first cryptographic token. Responsive to determining that the first cryptographic token is valid, fulfilling the request.

30 Claims, 9 Drawing Sheets

METHOD AND APPARATUS FOR LIMITING TRAFFIC RATE TO AN ORIGIN SERVER

FIELD

Embodiments of the invention relate to the field of network services; and more specifically to limiting traffic to an origin server.

BACKGROUND

Servers hosting network resources may have different processing and storage capabilities. The growth of users and applications attempting to access these network resources result in a growth in the amount of traffic handled by these servers. Further, attacks on domains hosted on servers (e.g., DoS attacks, bruteforce login attacks (login to a website or to an web API)) are becoming more commonplace on the Internet and are difficult to detect and mitigate and may result in large amount of non-desired traffic transmitted to the servers. Generally speaking, a DoS attack is launched by sending a large amount of packets to the domain with the intention to cause the domain to be unavailable or respond slowly to legitimate traffic.

Some techniques exist for limiting the rate of traffic towards servers hosting networking resources. For example, to prevent an origin server from being overwhelmed by legitimate traffic or by traffic part of denial of service attacks, rate limiting traffic techniques are implemented using block responses (e.g., HTTP 429) or throttling responses (e.g., HTTP 503).

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1A:
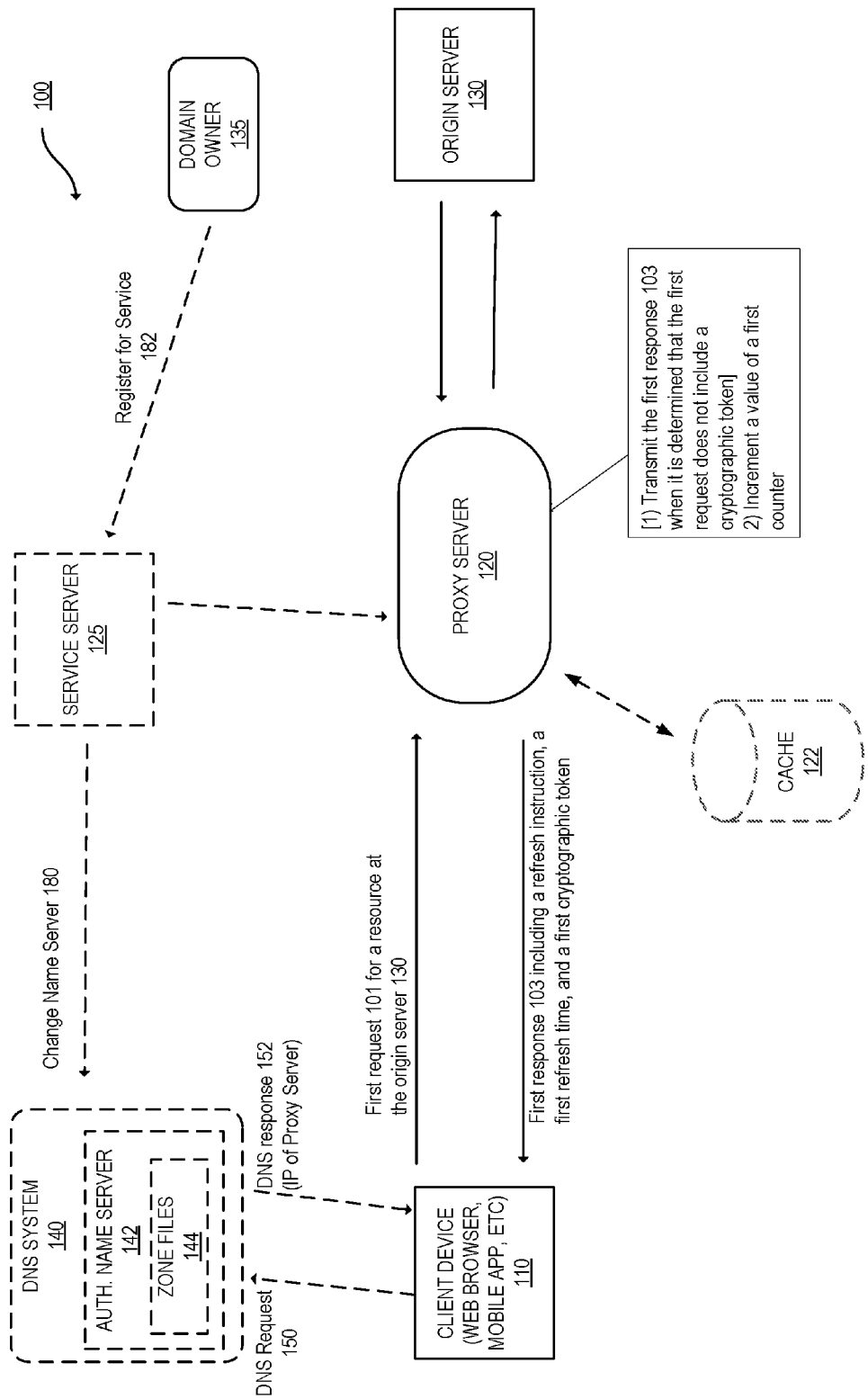
FIG. 1A illustrates a block diagram of an exemplary architecture in which a proxy server is operative to limit the rate of traffic to an origin server according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Throughout the following description similar reference numerals have been used to denote similar elements such as components, features of a system and/or operations performed in a system or element of the system, when applicable.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments of the present invention provide a mechanism for limiting traffic towards an origin server using a queueing mechanism based on a cryptographic token without requiring the proxy server to intercept the traffic and store a list of clients that request access to the resources at the origin server.

A method and an apparatus of limiting a rate at which traffic is received at an origin server are described. A first request for a resource at an origin server is received at a proxy server from a client device. A first response that includes a refresh instruction, a first refresh time, and a first cryptographic token that is not valid until a first predetermined time is reached is transmitted to the client device. The refresh instruction is to cause the client device to request the resource after the first refresh time has elapsed. A value of a first counter is incremented. As a result of the refresh instruction a second request for the resource is received from the client device. The second request includes the first cryptographic token. A determination that the first cryptographic token is not valid is performed. Responsive to determining that the first cryptographic token is not valid, the following operations are performed: (a) responsive to determining that a value of a second counter is strictly smaller than a maximum number of users that can access the origin server during a predetermined interval of time, transmitting a second response including the refresh instruction, a second refresh time, and a second cryptographic token that is not valid until a second predetermined time is reached, wherein the second predetermined time occurs earlier than the first predetermined time, incrementing the value of the second counter, and decrementing the value of the first counter, (b) responsive to determining that the value of the second counter is not strictly smaller than the maximum number of users that can access the origin server during a predetermined interval of time, transmitting a third response that includes the refresh instruction, the first refresh time, and the first cryptographic token, (c) receiving a third request for the resource from the client device, wherein the third request includes at least one of the first cryptographic token and the second cryptographic token, (d) repeating (a), (b) and (c) until receiving a request from the client device that includes at least one of the first cryptographic token and the second cryptographic token that is valid, and (e) responsive to determining that at least one of the first cryptographic token and the second cryptographic token is valid, fulfilling the third request.

FIG. 1A illustrates a block diagram of an exemplary architecture in which a proxy server is operative to limit the rate of traffic to an origin server according to one embodiment. The architecture 100 includes a client device 110, a proxy server 120, an origin server 130, a domain owner 135 and optional components such as service server 125 and DNS system 140.

The client device 110 is a computing device (e.g., laptop, workstation, smartphone, palm top, mobile phone, tablets, gaming system, set-top box, etc.) that is capable of accessing network resources (e.g., they include software such as client network applications (e.g., web browsers, mobile applications, etc.) that are capable of accessing network resources). In some embodiments, the client network applications are implemented based on web application program interfaces (APIs) enabling the client device to request access to resources hosted on a server. In some embodiments, the client device 110 is a malicious device (i.e., including malicious code (e.g., bots, malware, etc.) and/or operated by a malicious user) operative to launch an attack on the resources. In some embodiments, the attack can be a Denial of Service (DoS) attack in which a large amount of packets are sent to the domain with the intention of causing the domain to be unavailable or respond slowly to legitimate traffic.

The proxy server 120 is a computing device coupled with the client device through a network (not illustrated). The proxy server 120 is part of a cloud-based proxy service which provides different services for customers (e.g., the domain owner 135). The proxy server 120 is situated between client devices (e.g., client device 110) and the origin server 130. In one embodiment, the proxy server 120 is a reverse proxy server. Certain network traffic is received and processed through the proxy server 120. For example, web traffic (e.g., HTTP requests/responses, HTTPS requests/responses, SPDY requests/responses, etc.) for domains of the origin server 130 may be received and processed at the proxy server 120. In one embodiment, the domain owner 135 are customers of the cloud-based proxy service. The owner of the proxy server 120 is typically different than the owner of the origin server 130. In addition, the proxy server 120 is not typically part of the local network of the origin server 130. For example, the proxy server 120 is outside of the local area network of the origin server 130 and is typically not physically accessible by the owner/administrator of the origin server 130.

By way of example, the cloud-based proxy service may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), TCP stack optimizations, and/or other services. In one embodiment, the cloud-based proxy service provides a rate limiting service through a queueing mechanism based on cryptographic tokens as it will be described in further details below.

Generally speaking, the proxy server 120 receives certain network traffic from the client devices 110 requesting Internet resources. For example, the proxy server 120 may receive requests for an action to be performed on an identified resource (e.g., an HTTP GET request, an HTTP POST request, other HTTP request methods, or other requests to be applied to an identified resource on an origin server) from the client device 110. The request received from the client device 110 is destined for an origin server (e.g., origin server 130).

The proxy server 120 analyzes incoming traffic and takes one or more actions on the incoming traffic. In some embodiments, the incoming traffic may be part of an attack on resources of a domain (brute-force attack on an API, a DoS attack, or other types of attacks) and steps may be taken to mitigate the attack. In other embodiments, there may be a surge in incoming traffic from several client devices during an interval of time. The proxy server 120 causes the incoming traffic to be fulfilled. In some embodiments, the proxy server 120 may transit the outgoing traffic to the appropriate origin server 130. For example, the proxy server may transmit a request (e.g., an HTTP GET request) for a resource of the origin server 130. For example, an origin server may transmit a response (e.g., an HTTP response) with the requested resource to the proxy server. The proxy server may analyze the incoming traffic including the response and take one or more actions, including, for example, transmitting the response to the requesting client device. The proxy server may also cache resources for the domains and respond to requests from client devices locally if the requested resource is in cache (e.g., stored in cache 122).

In some embodiments, incoming traffic is received at a particular server 120 as a result of a DNS request 150 for a domain of one of the domain owner 135 resolving 152 to an IP address of the proxy server 120. By way of example, DNS record(s) for the domain "example.com" may resolve to an IP address of a server 120. In some embodiments, multiple domains that may be owned by different domain owners may resolve to the same server 120 (e.g., the same IP address or a different IP address of the proxy server 120).

For example, the domain owner 135 owns one or more domains (e.g., example.com) for which the proxy server 120 may receive requests. The proxy server 120 may receive requests for the resources at a given location of the domain (e.g., example.com/login). In one embodiment and as described in greater detail later herein, the proxy server 120 is operative to protect origin server 130 by limiting the rate at which requests for resources are received at the origin server.

The origin server 130 is an electronic device that serves and/or generates network resources (e.g., web pages, images, word processing documents, PDF files movie files, music files, or other computer files). For example the origin sever 130 may host the domain of the domain owner 135 (e.g., example.com) and is operative to respond to requests for resources at that domain. Although not illustrated in FIG.

1, it should be understood that the network resources of the origin servers may be stored separately from the device that responds to the requests.

In some embodiments, the domain owner 135 is a customer of a cloud-based service and registers their respective domain for the service (operation 182). For example, the authoritative name servers for each domain of the domain owner 135 may be changed to the authoritative name server 142 of the service at operation 180. It should be understood that the backup authoritative name server serving the domain may also be changed to an authoritative name server of the service. The zone file record for the domain is also changed (in the zone files 144) such that DNS resolution requests for the domain owned by the domain owner 135, which corresponds with the origin server 130, resolve to the proxy server 120. In one embodiment, a customer (e.g., the domain owners 135 or other entity (e.g., web administrators) on behalf of the domain owner 135) may use the service server 125 to change their authoritative name server to the authoritative name server 142 and change their zone file to have their domain point to the proxy server 120. In some embodiments, the domain owner 135 or an administrator of the domain can input through a graphical interface of the cloud-based proxy server a maximum number of client devices that may request a resource (e.g., access to the domain hosted at the origin server 130) during a predetermined interval of time. In a non-limiting example, the maximum number of client devices may be 100 or any number of client devices as determined by the owner/administrator of the origin server 130. In a non-limiting example, the predetermined interval of time can be 1 minute or any other interval of time during which not more than the maximum number of client devices can request resources from the origin server 130.

The service server 125 is an electronic device operated by the cloud-based proxy service, which provides a set of tools and interfaces for the domain owner 135 and is accessible over the Internet. For example, the service server 125, among other things, allows the domain owner 135 to register for the service, view statistics/logs of events, and report suspicious events. The service server 125 includes tools to assist the domain owner 135 in changing their authoritative name servers and zone file record. It should be understood, however, that the domain owner 135 may change their authoritative name server and zone file without use of the service server 125 (i.e., they may directly change the authoritative name server and zone file). The service server 125 includes tools to assist the domain owner 135 to input the maximum number of client devices that can access resources at the origin server 130 during a predetermined interval of time.

The DNS system 140 is used to refer to the DNS system as a whole and includes multiple DNS servers to resolve DNS requests. As illustrated, the DNS system 140 includes the authoritative name server 142, which is an authoritative name server for the service. Thus, the authoritative name server 142 is the authoritative name server for the domains corresponding to the origin server 130. Accordingly, when the DNS system 140 resolves a request for a domain corresponding to the origin server 130, the authoritative name server 142 provides the authoritative answer. It should be understood that the DNS system 140 includes more DNS servers (e.g., preferred domain servers, top-level domain name servers, other domain servers) than illustrated. It should also be understood that there may be multiple authoritative web servers for the service and they may be geographically distributed.

While FIG. 1 illustrates a single proxy server 120, in some embodiments the cloud-proxy service has multiple proxy servers that are geographically distributed. For example, in some embodiments, the service uses multiple point of presences (POPs). A POP is a collection of networking equipments (e.g., authoritative name servers and proxy servers) that are geographically distributed to decrease the distance between requesting client devices and content. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP. While FIG. 1 illustrates a single origin server 130 and a single client device 110 respectively coupled with the proxy server 120, in some embodiments the server is coupled with multiple origin servers and/or with multiple client devices. Moreover, in some embodiments, there are multiple proxy servers providing service for a particular domain.

In some embodiments, the client device 110 makes an initial request 101 for a resource at the origin server 130 (e.g., an HTTP GET request, or other request), which is transmitted to the proxy server 120. The proxy server 120 analyzes the initial request 101 and transmits a first response 103 to the client device 110. The first response includes a refresh instruction, a first refresh time, and a first cryptographic token. The first refresh time occurs before the first cryptographic token is valid. In some embodiments, the proxy server 120 determines to transmit the first response including the refresh instruction, the first refresh time and the first cryptographic token when it is determined that the first request does not include a cryptographic token (operation 1). The first cryptographic token is not valid until a first predetermined time is reached. For example, in some embodiments, the cryptographic token may include a first and a second part. The first part can be a time-based one time password (TOTP) generated at the proxy server for the first request. The second part can be a time indicator indicating the first predetermined time. For example, the second part is a timestamp generated by the proxy server 120 indicating a time at which the TOTP will be valid. In some embodiments, the first cryptographic token is included in a cookie in the first response 103. The refresh instruction causes the client device to request the resource after the first refresh time has elapsed. For example, the first refresh time can be selected from any of few milliseconds to few seconds. In a non-limiting example, the first refresh time is 15 seconds. In contrast, the first cryptographic token is valid after a longer period of time has elapsed when compared with the first refresh time. For example, the first cryptographic token is valid 1 min, 2 min, . . . , N min after the first request was received at the proxy server 120.

At operation 2, the proxy server 120 increments a value of a first counter. The value of the first counter indicates the number of client devices that have been issued a cryptographic token that is to be valid when the first predetermined time is reached. In a non-limiting example, the first predetermined time is a time T5, of 5 min after an initial counter had been started. The first counter is associated with the first predetermined time at which the first cryptographic token is valid. To issue a first cryptographic token to a client device, (upon receipt of the first request 101), the proxy server 120 inspects current counters with values associated to future periods of time at which several cryptographic tokens will become valid and issues a cryptographic token that is valid for the last period of time for which a counter value is available. For example, when the first predetermined time is T5, this is an indication that there are 5 counters, and the last counter is associated with T5. In addition, the counter associated with T5 has not yet reached a value of a maximum number of client devices that are to access the origin server 130 at time T5. Alternatively, if all existing counters have reached a maximum number of requests allowed to be transmitted to the origin server 130, a new counter is created and its value is incremented. The new counter is associated with a new time at which the first cryptographic token is to be valid, and this new time is assigned as the validity time of the first cryptographic token. For example, in this alternative embodiment, when the first predetermined time is T5, this is an indication that there are 4 counters, and the last counter is associated with T4. In addition, the counter associated with T4 has reached a value of a maximum number of client devices that are to access the origin server 130 at time T4 and therefore a new predetermined time is set T5 and a new counter is created and incremented. The new counter is associated with the new predetermined time T5. In all embodiments, the cryptographic token is generated to be valid at the validity time associated with the counter that is incremented.

In some embodiments, the first response 103 including the refresh instruction is transmitted when the proxy server 120 has determined that the origin server has already received requests from a maximum number of client devices that are allowed for a given interval of time. For example, the owner of the origin server 130 may input through a graphical interface of the cloud-based proxy server a maximum number of client devices that may request a resource during the interval of time. In a non-limiting example, the maximum number of client devices may be 100 or any number of client devices as determined by the owner/administrator of the origin server 130. In a non-limiting example, the interval of time can be 1 minute or any other interval of time during which not more than the maximum number of client devices can request resources from the origin server 130. Thus, in some embodiments, the first response can be sent once the maximum number of client devices has already transmitted requests for resources at the origin server 130. In other embodiments, the first response 103 is transmitted for any request received from a client device for resources at the origin server during a given period of time. In non-limiting example, the owner/administrator of the origin server 130 may determine that during a given day (e.g., at thanksgiving, Christmas day, etc.) any requests received from client devices will be queued by first transmitting the first response 103 including the refresh instructions. In other embodiments, a combination of a maximum number of client devices and a period of time can be used to trigger the traffic rate limiting mechanisms described herein. For example, the domain owner 135 may select a period of time during not more than a given maximum number of client devices can access the resources at the origin server 130.

While embodiments above are described with the owner and/or administrator of the origin server 130 determining the maximum number of client devices that can transmit requests to the origin server and the interval of time during which those request can be received by the origin server 130, in other embodiments, the proxy server 120 (or another server of the cloud-based proxy server—such as the service server 125) may automatically determine the maximum number of client devices and the interval of time. In these embodiments this determination may be performed based on analytics related to the performance of the origin server for processing requests for the resources.

Figure 1B:
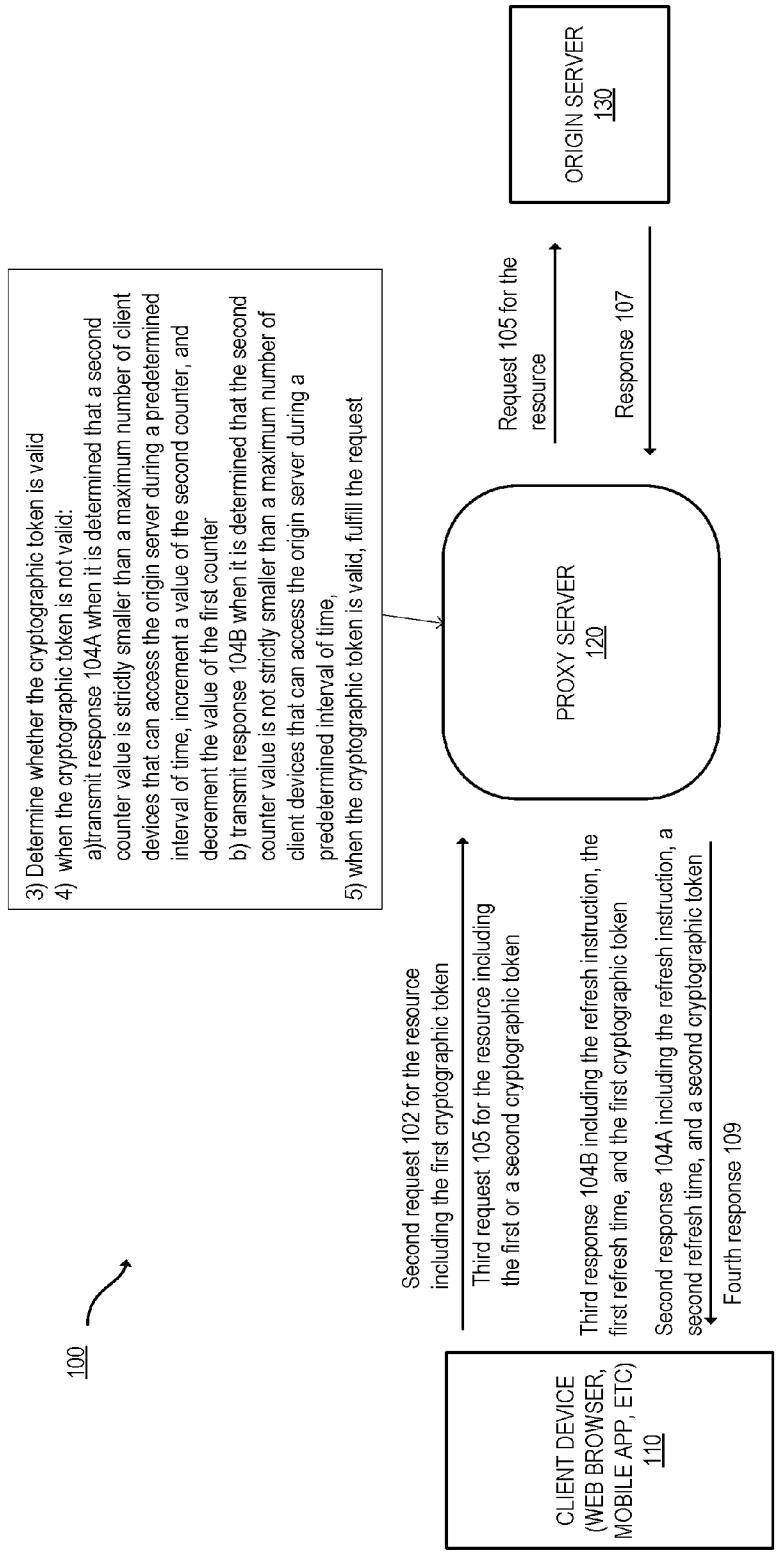
FIG. 1B illustrates a block diagram of an exemplary architecture in which a proxy server is operative to limit the rate of traffic to an origin server according to one embodiment.

FIG. 1B illustrates a block diagram of an exemplary architecture in which a proxy server is operative to limit the rate of traffic to an origin server according to one embodiment. Upon receipt of the first response including the refresh instruction, the client device 110 is caused to transmit a second request 102 for the resource at the origin server 130. The second request 102 is transmitted by the client device 110 after the first refresh time has elapsed. For example, when the refresh time is 15 seconds, the second request 102 is transmitted by the client device 110 fifteen seconds after the first response 103 was received at the client devices 110. The second request 102 includes the first cryptographic token.

Upon receipt of the second request 102 for the resource, the proxy server 120 determines, at operation 3, whether the first cryptographic token received as part of the second request 102 is valid or not. The first cryptographic token is valid when the second response is received after the first predetermined time is reached. For example, in some embodiments, the cryptographic token is valid when the internal clock of the proxy server 120 has reached the time indicated by the second part of the cryptographic token. While the second part of the cryptographic token is an indication of the time at which the token is valid, this second part is not used to determine the validity of the token. The cryptographic token is valid when the first part forming this token (e.g., in some embodiments, this first part can be a TOTP) is determined to be valid by the proxy server 120. For example, the proxy server 120 determines the validity of the cryptographic token based on the TOTP algorithm.

When the first cryptographic token is valid, operation 5, the second request 102 is fulfilled. In some embodiments, when the proxy server 120 fulfills the request, it analyzes the request and may transmit a request (e.g., request 105) to the origin server 130 to retrieve the requested resources. The origin server 130 may process the request and then transmit the response 107 (e.g., an HTTP response) with the requested resource to the proxy server 120. The proxy server may analyze the incoming response 107 and take one or more actions, including, for example, transmitting the response 109 to the requesting client device 110. In some embodiments, the origin server 130 may determine to block and or further delay a response to the client device 110. In these embodiments, while the request is transmitted from the proxy server 120 to the origin server 130, no response is received from the origin server 130 to the proxy server 120. In some embodiments, when the proxy server 120 fulfills the request, it analyzes the request and may retrieve the requested resources from the cache 122 instead of transmitting the request to the origin server 130.

When the first cryptographic token is not valid, operation 4, the second request 102 is not fulfilled by the proxy server 120. The proxy server 120 transmits a response including a refresh instruction, a refresh time and a cryptographic token. In some embodiments, the refresh time and the cryptographic token are determined based on the numbers of requests that are already waiting to be fulfilled by the proxy server 120. The refresh time and the cryptographic token are determined based on the value of one or more counters. The value of each counter indicates a number of clients that have a cryptographic token that is to be valid between at an associated time. Thus, based on the value of the counters, the proxy server 120 may determine to send a response 104B or alternatively to transmit the response 104A. The response 104B includes the refresh instruction, the first refresh time unchanged, and the first cryptographic token unchanged. In this case, the request for the resource from the client device 110 is still to be fulfilled when the first cryptographic token is to become valid, i.e., when the first predetermine time is reached. Alternatively, the response 104A includes the refresh instruction, a second refresh time and a second cryptographic token. In some embodiments, the second refresh time can be the same as the first refresh time. The second cryptographic includes a first part that is to be valid when a second predetermined time is reached. The second predetermined time occurs before the first predetermined time. The second part of the cryptographic token indicates the second predetermined time.

The proxy server 120 transmits the second response 104A or the third response 104B based on the state of the counters that are associated with the different predetermined times. For example, when the proxy server 120 determines that a second counter value is strictly smaller than a maximum number of client devices that can access the origin server during a predetermined interval of time, it assigns the second cryptographic token, and transmits the response 104A. The proxy server 120 then increments a value of the second counter, and decrements the value of the first counter that is associated with the first predetermined time of the first cryptographic token. Alternatively, when the proxy server 120 determines that the second counter value is not smaller than the maximum number of client devices that can access the origin server during a predetermined interval of time, it does not modify the cryptographic token, and transmits the response 104B including the first cryptographic token. In this case, the proxy server 120 does not update the value of any counters.

The transmission of a second response 104A or the third response 104B in response to the receipt of the second request 102, allows the proxy server 120 to enable the client device 110 to access the origin server at a time that occurs earlier than the time that was originally assigned for the client device depending on whether other requests had been already fulfilled at the origin server.

The embodiments described herein enable a proxy server to limit the rate of traffic towards an origin server by performing a queueing mechanisms of requests received from client devices based on cryptographic tokens that are valid at different period of times. The proxy server assigns a maximum number of tokens to a maximum number of client devices that are allowed for a given interval of time. At each predetermined time associated with the validity of a token, a maximum number of cryptographic tokens can be valid. The embodiments described herein enable the proxy server to limit the rate at which the origin server receive requests from client devices without requiring that the proxy server 120 to store a list of client devices that requests access to the origin server. Further, the mechanisms allow a number of client devices to be permitted access to an origin server at a rate that the origin server can handle whilst preserving a fair first-come first-served order of access to end users.

Figure 2A:
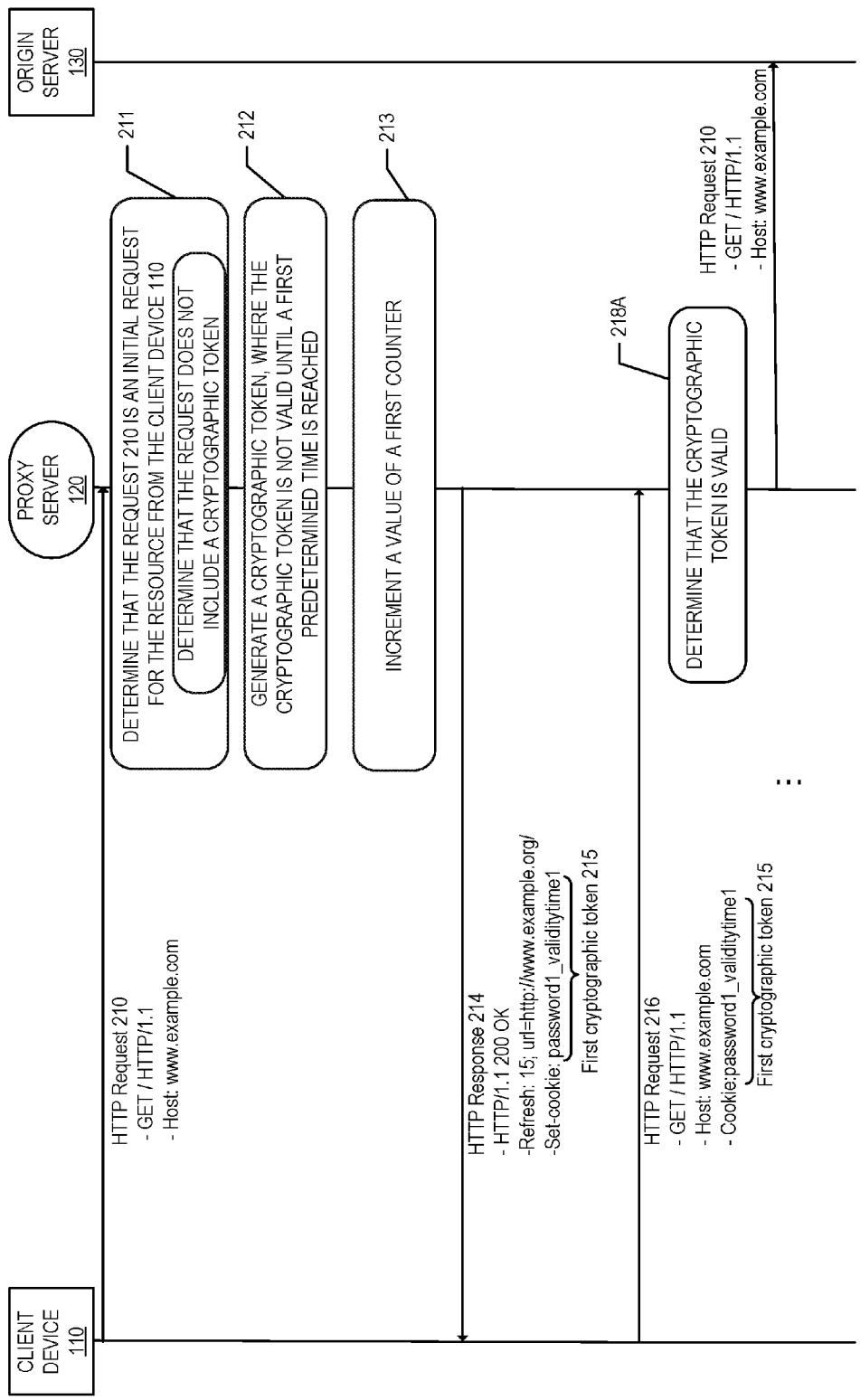
FIG. 2A illustrates a block diagram of exemplary operations performed for limiting traffic rate to an origin server in accordance with some embodiments.

FIG. 2A illustrates a block diagram of exemplary operations performed for limiting traffic rate to an origin server in accordance with some embodiments. The proxy server 120 receives an initial HTTP request 210 for a resource where the request. The request 210 includes a first location of the resource "/" at the domain www.example.com. The proxy server 120 analyzes the initial request 210 and determines at operation 211 that the request is an initial request received from the client device 110 for the resource at the origin server. For example, in some embodiments, the proxy server 120 may determine that the request is an initial request by generates by determining that it does not include a cryptographic token. At operation 212, the proxy server generates a cryptographic token where the cryptographic token is not valid until a first predetermined time is reached.

At operation 213, the proxy server 120 increments a value of a first counter. The value of the first counter (Counter_T5) indicates the number of client devices that have been issued a cryptographic token that is to be valid when the first predetermined time is reached. In a non-limiting example, the first predetermined time is a time T5 (e.g., that represents 5 min after an initial counter, counter_T0, had been started). The first counter (Counter_T5) is associated with the first predetermined time (T5) at which the first cryptographic token is valid. To issue a first cryptographic token to the client device 110, (upon receipt of the first request 210), the proxy server 120 inspects current counters (Counters_Ti, i=1, . . . , N) with values associated to future periods of time at which several cryptographic tokens will become valid and issues a cryptographic token that is valid for the last period of time for which a counter value is available. Alternatively, if all existing counters have reached a maximum number of requests allowed to be transmitted to the origin server 130, a new counter is created and its value is incremented. The new counter is associated with a new time at which the first cryptographic token is to be valid, and this new time is assigned as the validity time of the first cryptographic token. Thus, the cryptographic token is generated to be valid at that validity time.

In some embodiments, the cryptographic token may include a first and a second part. The first part can be generated with a cryptographic algorithm such as Time-based One-time Password Algorithm (TOTP), described in RFC 6238, May 2011. In FIG. 2A, the first part is referred to as "password1". In some embodiments, the first part of the cryptographic token is determined based on a key generated from a server secret, an identifier of the networking resource (e.g., a web site identifier), an identifier of the rate limit, an identifier of the client device from which the request is received (e.g., an identifier of the user agent (e.g., an Internet Protocol (IP) address of the user agent), and additional information on the client device 110 (e.g., the user agent string). In some embodiments, the proxy server 120 may use a subset or all of the parameters described above for the generation of the first part of the cryptographic token. In some embodiments, the first part of the cryptographic token can be used by the client device 110 (e.g., the user agent running on the client device 110) that originally obtained it as a result of requesting a resource and for the particular requested resource. Thus, in these embodiments, when the client device 110 requests a second resource (e.g., a second domain) hosted at the same server 130, another first part of the cryptographic token is generated. In effect this prevents a valid first part of the cryptographic token from being shared with others for the purpose of jumping the queueing mechanism and accessing the resource earlier.

The second part can be a time indicator indicating the first predetermined time, i.e., the time at which the first part of the cryptographic token is to be valid. In FIG. 2A, the second part is referred to as validitytime1. For example, the second part is a timestamp generated by the proxy server 120 indicating a time at which the first part of the cryptographic token will be valid. In a non-limiting example, the first predetermined time is a time T5=5 min after an initial counter had been started.

The proxy server 120 transmits a response 214 to the client device 110 in the form of a webpage with refresh instruction, a first refresh time and the first cryptographic token 215. In the non-limiting example of FIG. 2A, the first refresh time is 15 seconds. The response 214 causes the client device 110 to refresh the page of the requested resource by transmitting a second request 216 after the first refresh time has elapsed. The response 214 includes a first cryptographic token 215. For example the first response 214 can be an HTTP response with a "200" code to indicate that the request has succeeded. The response 214 includes a refresh instructions with a location of the resource (e.g., URI "example.com/"). The response 214 further includes a set-cookie instruction including the first cryptographic token 215. The first cryptographic token 215 includes the password1 and the validitytime1. The refresh instruction causes the client device to request the resource after the first refresh time has elapsed, i.e., after 15 seconds in this example. While 15 seconds is provided as an example for the first refresh time, the embodiments are not so limited and any other value for the refresh time can be used without departing from the scope of the present invention. For example, the first refresh time can be selected from any of few milliseconds to few seconds. In the illustrated example, the first refresh time is 15 seconds. The first part of the cryptographic token "password1" is to become valid when the time indicated by the second part "validitytime1" of the cryptographic token is reached. In typical example, the refresh operation occurs earlier than the validity of the cryptographic token. For example, the client device is to refresh the page after 15 seconds, while the cryptographic token is to be valid after several minutes.

The proxy server then receives a second request 216 for the resource as a result of the refresh instruction. The second request 216 is received after the first refresh time has elapsed. In this example, after 15 seconds from receipt of the response 214 at the client device 110. The second request 216 includes the first cryptographic token 215. At operation 218A, the proxy server determines that the cryptographic token is valid. For example, if the cryptographic token had been generated some time ago and the validity time is now reached, the first cryptographic token is valid. In that case, the proxy server 120 fulfills the request. The request 210 is transmitted to the origin server. The origin server 130 may then process the request and transmit the resource to the client device 110. In some embodiments, the origin server 130 may determine to block and or further delay a response to the client device 110. In these embodiments, while the request is transmitted from the proxy server 120 to the origin server 130, no response is received from the origin server 130 to the proxy server 120.

Figure 2B:
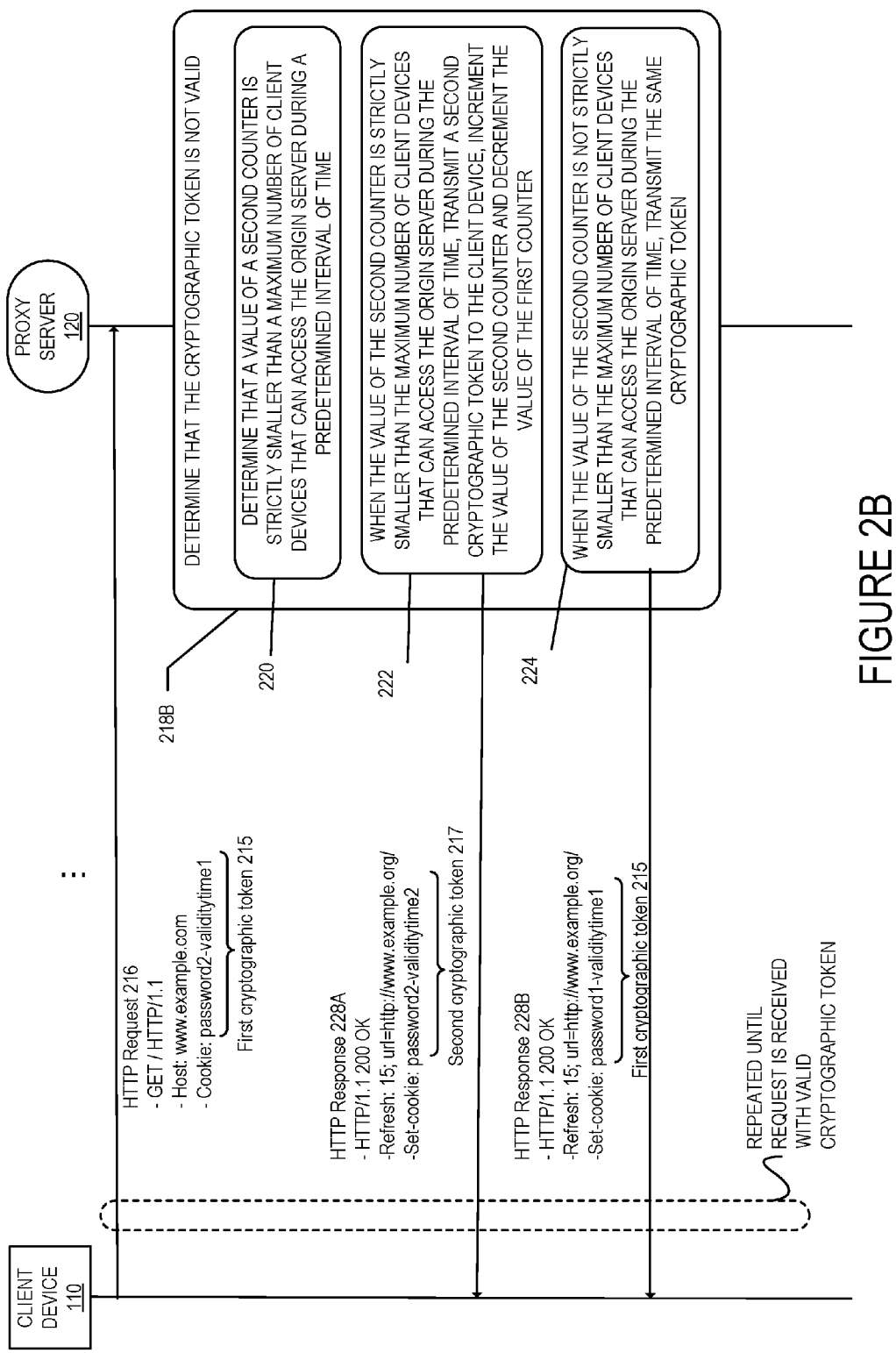
FIG. 2B illustrates a block diagram of exemplary operations performed for limiting traffic rate to an origin server in accordance with some embodiments.

Alternatively, the proxy server 120 determines that the cryptographic token is not yet valid. FIG. 2B illustrates a block diagram of exemplary operations performed for limiting traffic rate to an origin server when the cryptographic token is not valid, in accordance with some embodiments.

When the first cryptographic token is not valid, operation 218B, the second request 216 is not fulfilled by the proxy server 120. The proxy server 120 transmits a response including a refresh instruction, a refresh time and a cryptographic token. In some embodiments, the refresh time and the cryptographic token are determined based on the numbers of requests that are already waiting to be fulfilled by the proxy server 120. The refresh time and the cryptographic token are determined based on the value of one or more counters (Counter_Ti, for i=1 . . . N). The value of each counter (Counter_Ti) indicates a number of clients that have a cryptographic token that is to be valid between at an associated time (Ti). Each counter (Counter_Ti) has a maximum value that is the maximum number of client devices that can access the origin server during an interval of time. In some embodiments, the interval of time can be few seconds to few minutes. In one non-limiting example, the interval of time can be 1 min. In some embodiments, the maximum number of client devices that can access the origin server 130 are predetermined by the owner/administrator of the origin server 130 or alternatively automatically determined by the proxy server based on performance analysis data.

Thus, based on the respective values of the counters (Counter_Ti), the proxy server 120 may determine to send a response 228A or alternatively to transmit the response 228B. The response 228B includes the refresh instruction, the first refresh time, and the first cryptographic token unchanged. In this case, the request for the resource from the client device 110 is still to be fulfilled when the first cryptographic token 215 is to become valid, i.e., when the first part of the first cryptographic token 215 is valid when the first predetermine time "validity time1" (e.g., T5) is reached. Alternatively, the response 228A includes the refresh instruction, a second refresh time and a second cryptographic token 217. In some embodiments, the second refresh time can be the same as the first refresh time. In the illustrated figure, the second refresh time is 15 seconds. In other embodiments, the second refresh time can be set to a value different than the value of the first refresh time. For example, the second refresh time can be smaller than the first refresh time (e.g., 5 seconds) or alternatively it can be greater (e.g., 20 seconds). The second cryptographic token 217 includes a first part "password2" that is to be valid when the second predetermined time "validity time2" is reached. The second predetermined time "validity time 2" occurs before the first predetermined time "validity time1".

The proxy server 120 transmits the second response 228A or the third response 228B based on the state of the counters that are associated with the different predetermined times. For example, at operation 220, the proxy server 120 determines whether a second counter value is strictly smaller than a maximum number of client devices that can access the origin server during a predetermined interval of time. While the embodiments below are described with reference to the proxy server 120 tracking and updating five counter counterT1 . . . Counter_T5, this is intended to be exemplary and should not be considered as a limitation of the embodiments. In other embodiments, any number of counters can be used by the proxy server 120 to track the requests from the client devices to the origin server 130. The first request from the client device 110 is assigned a first cryptographic token that is associated with a first counter Counter_T5. Upon receipt of the second request, the proxy server 120 determines if there is a second counter Counter_T4 that has not yet reached a maximum number of client devices that can access the origin server 130. By performing this determination, the proxy server 120 determines whether the client device 110 can be assigned an updated cryptographic token 217 that is to be valid earlier than the first cryptographic token 215. At operation 222, when the value of the second counter Counter_T4 is strictly smaller than the maximum number of client devices that can access the origin server 130 during the predetermined interval of time, the proxy server 120 transmits the second cryptographic token 217. The proxy server 120 increments the value of the second counter Counter_T4 indicating that a new request has been assigned a second cryptographic token that is to be valid at time T4. The proxy server 120 decrements the value of the first counter Counter_T5 indicating that a request that has been assigned the first cryptographic token that is to be valid at time T5 is no longer assigned that cryptographic token.

Alternatively, when the proxy server 120 determines that the second counter value Counter_4 is not smaller than the maximum number of client devices that can access the origin server during a predetermined interval of time, the proxy server does not modify the first cryptographic token 215, and transmits the response 228B including the first cryptographic token 215. In this case, the proxy server 120 does not update the value of any counters.

The transmission of a second response 228A or the third response 228B in response to the receipt of the second request 216, allows the proxy server 120 to enable the client device 110 to access the origin server at a time that occurs earlier than the time that was originally assigned for the client device depending on whether other requests had been already fulfilled at the origin server. In some embodiments, to determine the counter to which the client device 110 had contributed when it obtained the first cryptographic token, the proxy server may use the second part of the cryptographic token "validity time1". The validity time indicates the time at which the cryptographic token will be valid as well as the counter to which this client device request contributed. Therefore, when receiving the second request 216, the proxy server 120 determines based on the validitytime1 value that the associated counter is Counter_T5 and may determine whether the Counter_T4 has a value strictly smaller than the maximum number of client devices that can access the origin server 130 during a predetermined interval of time. Other techniques can be used for identifying the counter to which the request had contributed without departing from the scope of the present invention.

Figure 2C:
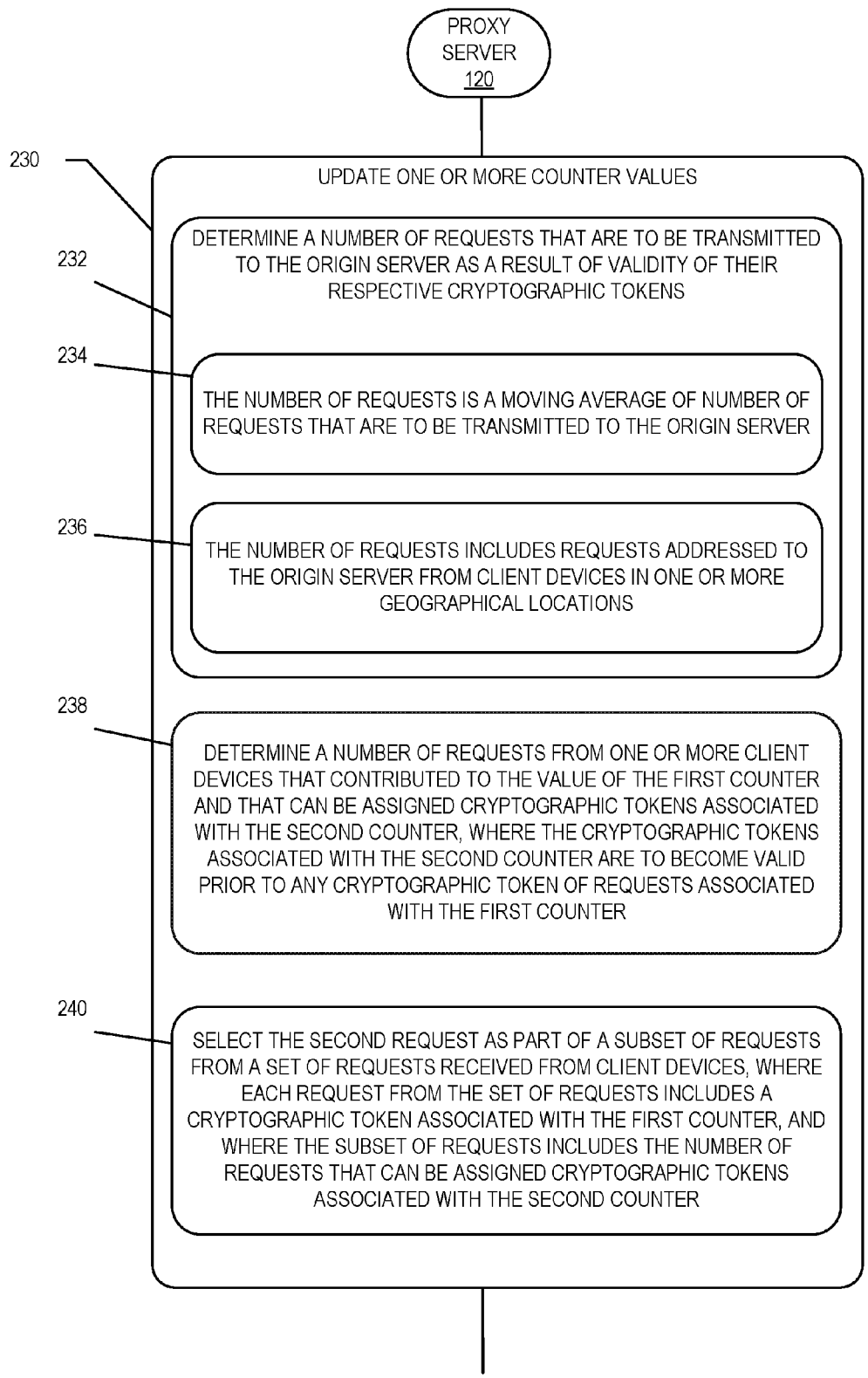
FIG. 2C illustrates a block diagram of exemplary operations performed for updating values of counters indicating the number of client devices assigned cryptographic tokens that are to be valid at respective predetermined times, in accordance with some embodiments.

FIG. 2C illustrates a block diagram of exemplary operations performed for updating 230 values of counters indicating the number of client devices assigned cryptographic tokens that are to be valid at respective predetermined times, in accordance with some embodiments. In some embodiments, the values of the different counters indicating the number of requests that are assigned a cryptographic token with a respective validity time are dynamically updated upon validation of tokens. In some embodiments, the update of the counters is performed on a regular basis, every few seconds for example. In a non-limiting example, the update of the counters can be performed at an interval equal to the refresh time assigned for the requests (e.g., 15 seconds). In other embodiments, the interval of time at which the counters are updated is independent from the refresh time assigned to the requests received from the client devices. In some embodiments, the update of the counters is performed at the proxy server in parallel to the operations performed by the proxy server 120 for responding to requests from the client devices. To determine how to assign a cryptographic token to a request from a client device, the proxy server 120 takes into consideration the continuously updated values of these counters.

At operation 232, the proxy server 120 determines a number of requests that are to be transmitted to the origin server 130 as a result of validity of their respective cryptographic tokens. In some embodiments, at a given time, the proxy server 120 determines how many requests are to be fulfilled and transmitted to the origin server 130 since the last update of the counters. The requests are fulfilled upon validity of their respective cryptographic tokens. In some embodiments, determining the number of requests that are to be fulfilled since the last counter update is determined, operation 234, based on a moving average of number of requests that are transmitted to the origin server 130 since that last update. In some embodiments, the number of requests includes, operation 236, requests addressed to the origin server 130 from client devices in one or more geographical locations. For example, the proxy server 120 may receive from different PoPs of the cloud based proxy server estimates of a number of request that are to be transmitted to the origin server 130 as a result of validity of their respective tokens. In these embodiments, the interval between the operations of updating the counter values is selected such that the proxy server 120 has sufficient time to receive updates from all geographic locations that handle traffic to the domain hosted at the origin server 130.

Upon determination of the number of requests that are to be valid, the proxy server 120 may update the various counters associated with the validity times of the cryptographic tokens. Referring back to the previous example, where the proxy server 120 is tracking at least five counters Counter_Ti for i=1 . . . 5. The proxy server 120 determines for each counter the number of requests that can be assigned an earlier validity time and an associated cryptographic token. For example, the proxy server 120 determines a number of requests from one or more client devices that contributed to the value of the first counter Counter_T5 and that can be assigned cryptographic tokens associated with the second counter Counter_T4. The cryptographic tokens associated with the second counter are to become valid at validity time T4 that occurs earlier than the validity time T5 of any cryptographic tokens of requests associated with the first counter Counter_T5.

In a non-limiting example, at the time the update of the counters is performed, the proxy server 120 may track the following counters: Counter_T1 with a value of 70 requests assigned a cryptographic token that is to be valid at time T1; Counter_T2 with a value of 90 requests assigned a cryptographic token that is to be valid at time T2; Counter_T3 with a value of 100 requests assigned a cryptographic token that is to be valid at time T3; Counter_T4 with a value of 90 requests assigned a cryptographic token that is to be valid at time T4; Counter_T5 with a value of 60 requests assigned a cryptographic token that is to be valid at time T5. In this example, the maximum number of client devices that are to access the origin server 130 during an interval of 1 minute are 100 client devices.

At the time the update of the counter is performed, the proxy server 120 determines that 10 requests are to be valid and therefore 10 requests assigned a cryptographic token that is to be valid at time T1 may be selected to be fulfilled between the present update and the next update of the counters. This results in the number of requests associated with a validity time of T1 being reduced from 70 to 60, and 40 client devices that can be assigned a validity time T1 in order for the counter_T1 reaching the maximum number of client devices that can access the origin server 130 in 1 min. Therefore, the proxy server may select 40 client devices that are assigned a cryptographic token with a validity time T2 to be assigned a new cryptographic token that has a validity time T1. In a similar manner, the proxy server 120 may select 50 client devices that are assigned a cryptographic token with a validity time T3 to be assigned a new cryptographic token that has a validity time T2. In a similar manner, the proxy server 120 may select 50 client devices that are assigned a cryptographic token with a validity time T4 to be assigned a new cryptographic token that has a validity time T3. The proxy server 120 may select 60 client devices that are assigned a cryptographic token with a validity time T5 to be assigned a new cryptographic token that has a validity time T4.

Following the selection of the client devices to be assigned a cryptographic token with a different validity time (i.e., an earlier validity time), the values of the counters Counter_Ti are updated to the following: Counter_T1=100; Counter_T2=100; Counter_T3=100; Counter_T4=100; Counter_T5=0.

Referring back to FIG. 2C, at operation 238, the proxy server 120 determines a number of requests from one or more client devices that contributed to the value of the first counter (e.g., Counter_T5) and that can be assigned cryptographic tokens associated with the second counter (e.g., Counter_T4). The cryptographic tokens associated with the second counter are to become valid prior to any cryptographic tokens of requests associated with the first counter. With reference to FIG. 2B, when a second request 216 is received at the proxy server and the counters are being updates, the proxy server determines that the client device 110 may be assigned an earlier validity time. Thus, the transmitting of the second response 228A including the updated cryptographic token with an updated validity time "validitytime2" is performed in response to selecting, operation 240, the client device as part of the 60 client devices that are to be assigned a new cryptographic token. While in the example presented herein all of the client devices with a cryptographic token that is to be valid at time T5 are selected to be assigned a new token with an earlier validity time, in other examples, not all client devices can obtain an updated cryptographic token and some of them may remain with an associated T5 validity time. In these embodiments, several techniques can be used to select which client devices are to be assigned updated tokens. For example, a leaky bucket algorithm can be used to select these client devices.

The operations in the flow diagrams below will be described with reference to the exemplary embodiments of the FIGS. 1A-2C. However, it should be understood that the operations of the flow diagram can be performed by embodiments of the invention other than those discussed with reference to the other figures, and the embodiments of the invention discussed with reference to FIGS. 1A-2C can perform operations different than those discussed with reference to the flow diagram.

Figure 3:
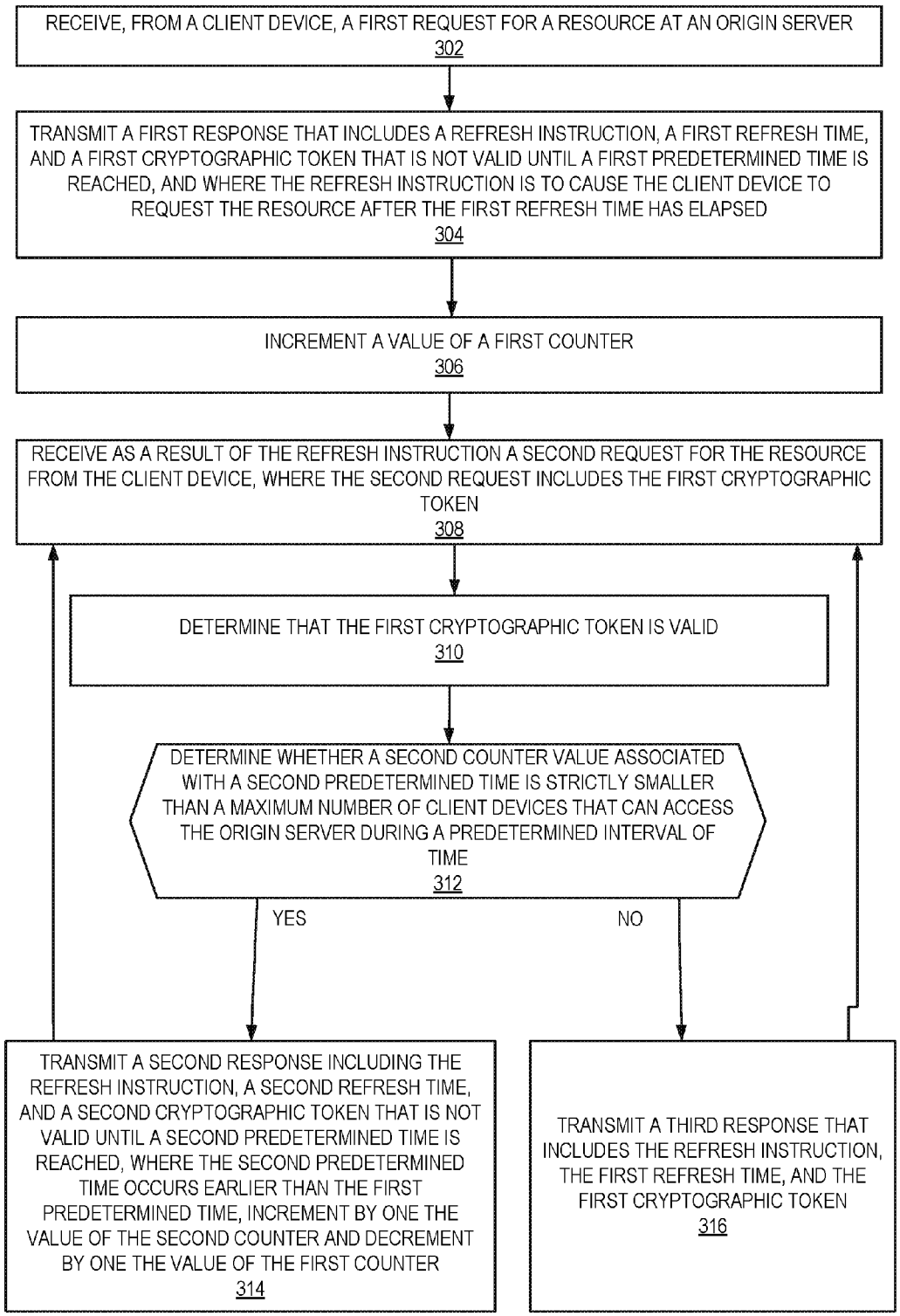
FIG. 3 illustrates a flow diagram of exemplary operations for limiting traffic rate to an origin server in accordance with some embodiments.

FIG. 3 illustrates a flow diagram of exemplary operations for limiting traffic rate to an origin server in accordance with some embodiments. At operation 302, the proxy server receives, from a client device, a first request for a resource at an origin server 130. In some embodiments, the proxy server 120 determines that the first request is an initial request from the client device 110 for the resource that is hosted at the origin server 130. For example, in some embodiments, the proxy server 120 may determine that the first request is an initial request by determining that the request does not include a cryptographic token. The first request can be an HTTP request (e.g., HTTP Get, or other HTTP requests).

At operation 304, the proxy server 120 transmits, to the client device 110, a first response that includes a refresh instruction, a first refresh time, and a first cryptographic token. The first cryptographic token is not valid until a first predetermined time is reached. The refresh instruction is to cause the client device 110 to request the resource after the first refresh time has elapsed. At operation 306, the proxy server 120 increments a value of a first counter. The value of the first counter indicates the number of client devices that have been issued a cryptographic token that is to be valid when the first predetermined time is reached. In a non-limiting example, the first predetermined time is a time T5 (e.g., that represents 5 min after an initial counter, counter_T0, had been started). The first counter (Counter_T5) is associated with the first predetermined time (T5) at which the first cryptographic token is valid. To issue a first cryptographic token to the client device 110, (upon receipt of the first request), the proxy server 120 inspects current counters (Counters_Ti, i=1, . . . , N) with values associated to future periods of time at which several cryptographic tokens will become valid and issues a cryptographic token that is valid for the last period of time for which a counter value is available. Alternatively, if all existing counters have reached a maximum number of requests allowed to be transmitted to the origin server 130, a new counter is created and its value is incremented. The new counter is associated with a new time at which the first cryptographic token is to be valid, and this new time is assigned as the validity time of the first cryptographic token. Thus, the cryptographic token is generated to be valid at that validity time.

At operation 308, the proxy server 120 receives as a result of the refresh instruction a second request for the resource from the client device 110. The second request includes the first cryptographic token. The second request is transmitted from the client device 110 after the refresh time has elapsed. For example, when the refresh time is 15 seconds, the client device 110 transmits the second request for the resource including the first cryptographic token 15 seconds after it receives the first response from the proxy server 120.

At operation 310, the proxy server 120 determines that the first cryptographic token is not valid. When the first predetermined time has not yet been reached, the first cryptographic token is not valid.

In response to determining that the first cryptographic token is not valid, the proxy server 120 determines at operation 312 whether a value of a second counter is strictly smaller than a maximum number of users that can access the origin server during a predetermined interval of time. In response to determining that the value of the second counter is strictly smaller than the maximum number of client devices that can access the origin server 130 during a predetermined interval of time, the proxy server 120 transmits, at operation a second response including the refresh instruction, a second refresh time, and a second cryptographic token that is not valid until a second predetermined time is reached. The second predetermined time occurs earlier than the first predetermined time. In this scenario, the client device 110 is assigned an updated cryptographic token that is to be valid prior to the first cryptographic token that it was initially assigned. This allows a fair queueing mechanism of the requests received for resources hosted at the origin server 130, such that when the origin server 130 is available for processing requests, the requests are moved up the queueing mechanism by being assigned cryptographic tokens that are to be valid earlier than their previously assigned token. The proxy server 120 further increments the value of the second counter, and decrements the value of the first counter. In some embodiments, the second refresh time can be the same as the first refresh time. In other embodiments, the second refresh time can be different than the first refresh time.

In response to determining that the value of the second counter is not strictly smaller than the maximum number of users that can access the origin server during a predetermined interval of time, the proxy server 120 transmits, at operation 314, a third response that includes the refresh instruction, the first refresh time, and the first cryptographic token. In this case, the client device 110 is not assigned an updated cryptographic token and it retains its place in the queueing mechanism.

The process is repeated until the cryptographic token is valid. For example, the proxy server 120 receives a third request for the resource from the client device 110 as a result of the second response. The third request includes at least one of the first cryptographic token and the second cryptographic token, depending on which one was last transmitted to the client device 110.

Figure 4:
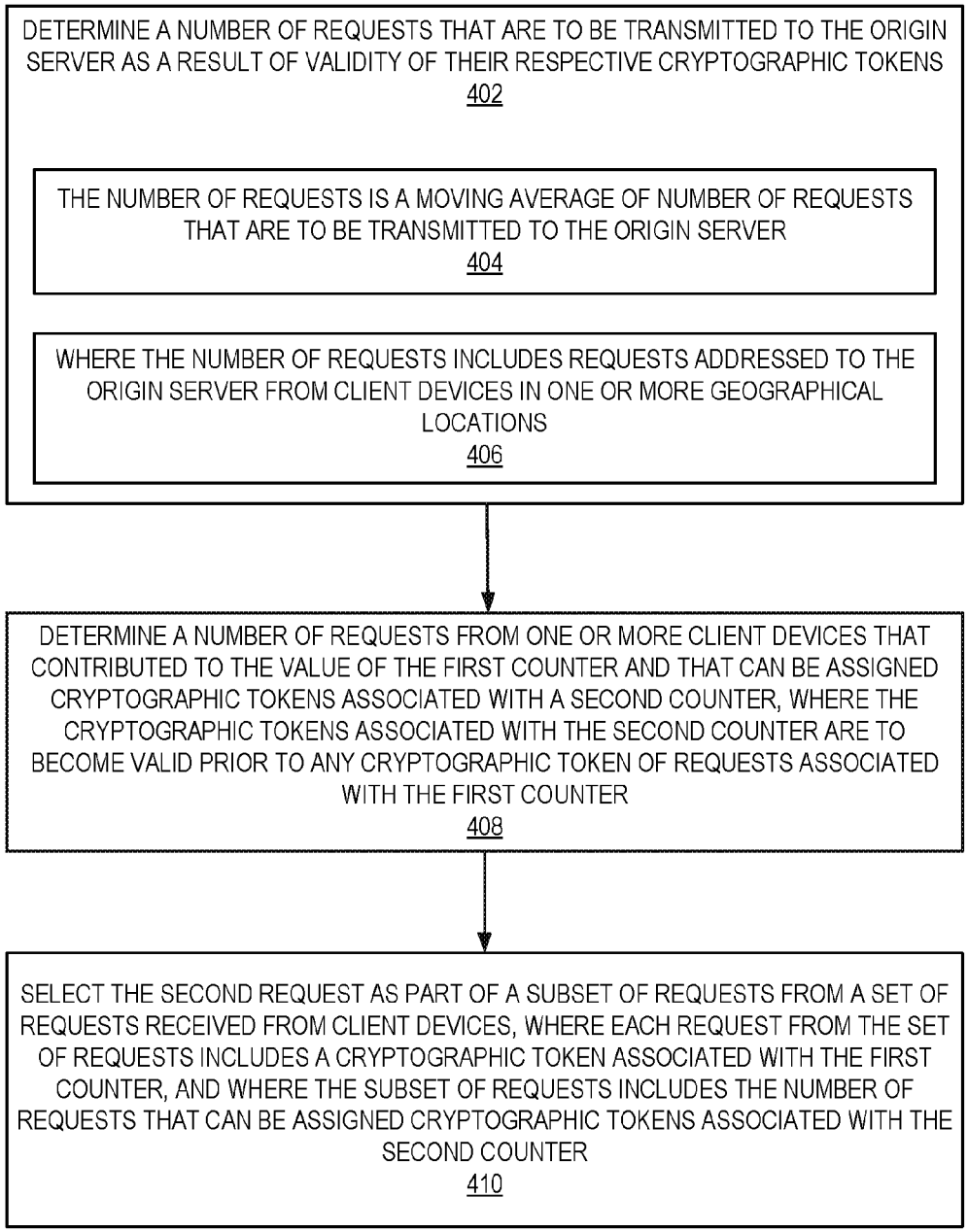
FIG. 4 illustrates a flow diagram of exemplary operations for updating counter values in accordance with some embodiments.

FIG. 4 illustrates a flow diagram of exemplary operations for updating counter values in accordance with some embodiments. At operation 402, the proxy server 120 determines a number of requests that are to be transmitted to the origin server 130 as a result of validity of their respective cryptographic tokens. In some embodiments, at a given time, the proxy server 120 determines how many requests are to be fulfilled and transmitted to the origin server 130 since the last update of the counters. The requests are fulfilled upon validity of their respective cryptographic tokens. In some embodiments, determining the number of requests that are to be fulfilled since the last counter update is determined, operation 404, based on a moving average of number of requests that are transmitted to the origin server 130 since that last update. In some embodiments, the number of requests includes, operation 406, requests addressed to the origin server 130 from client devices in one or more geographical locations. For example, the proxy server 120 may receive from different PoPs of the cloud based proxy server estimates of a number of request that are to be transmitted to the origin server 130 as a result of validity of their respective tokens. In these embodiments, the interval between the operations of updating the counter values is selected such that the proxy server 120 has sufficient time to receive updates from all geographic locations that handle traffic to the domain hosted at the origin server 130.

Upon determination of the number of requests that are to be valid, the proxy server 120 may update the various counters associated with the validity times of the cryptographic tokens. At operation 408, the proxy server 120 determines a number of requests from one or more client devices that contributed to the value of the first counter (e.g., Counter_T5) and that can be assigned cryptographic tokens associated with the second counter (e.g., Counter_T4). The cryptographic tokens associated with the second counter are to become valid prior to any cryptographic tokens of requests associated with the first counter. With reference to FIG. 2B, when a second request 216 is received at the proxy server and the counters are being updates, the proxy server determines that the client device 110 may be assigned an earlier validity time. Thus, the transmitting of the second response (e.g., 104A, 228A) including the updated cryptographic token with an updated validity time is performed in response to selecting, at operation 410, the client device as part of the client devices that are to be assigned a new cryptographic token. In these embodiments, several techniques can be used to select which client devices are to be assigned updated tokens. For example, a leaky bucket algorithm can be used to select these client devices.

Figure 5:
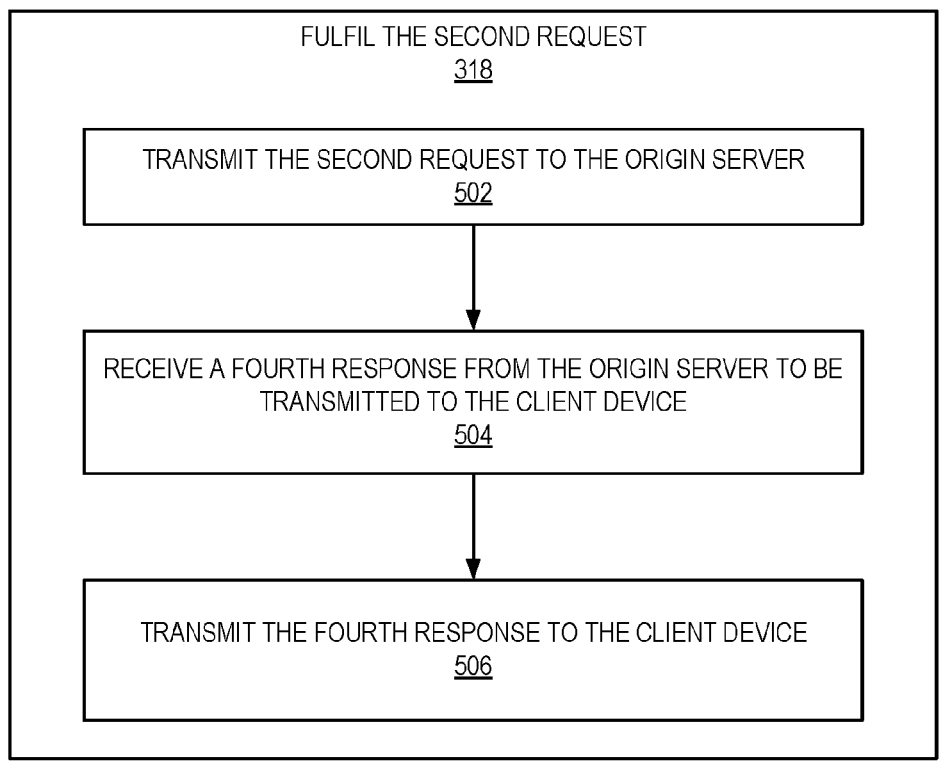
FIG. 5 illustrates a flow diagram of exemplary operations for fulfilling a request for a domain at the origin server in accordance with some embodiments.

FIG. 5 illustrates a flow diagram of exemplary operations for fulfilling a request for a domain at the origin server in accordance with some embodiments. When the proxy server 120 determines that a request received from the client devices 110 includes a valid cryptographic token (i.e., the first part of the cryptographic token is valid), the proxy server 120 fulfills the request, at operation 318. In some embodiments, the proxy server 120 analyzes the request and may transmit, at operation 502, the request (e.g., the second request or the third request) to the origin server 130 to retrieve the requested resources. The origin server 130 may process the request and then transmit a response (e.g., an HTTP response) with the requested resource to the proxy server 120. The proxy server 120 receives the response, at operation 504, analyzes the incoming response and take one or more actions, including, for example, transmitting, at operation 506, the response to the requesting client device 110. In some embodiments, the origin server 130 may determine to block and or further delay a response to the client device 110. In these embodiments, while the request is transmitted from the proxy server 120 to the origin server 130, no response is received from the origin server 130 to the proxy server 120.

Figure 6:
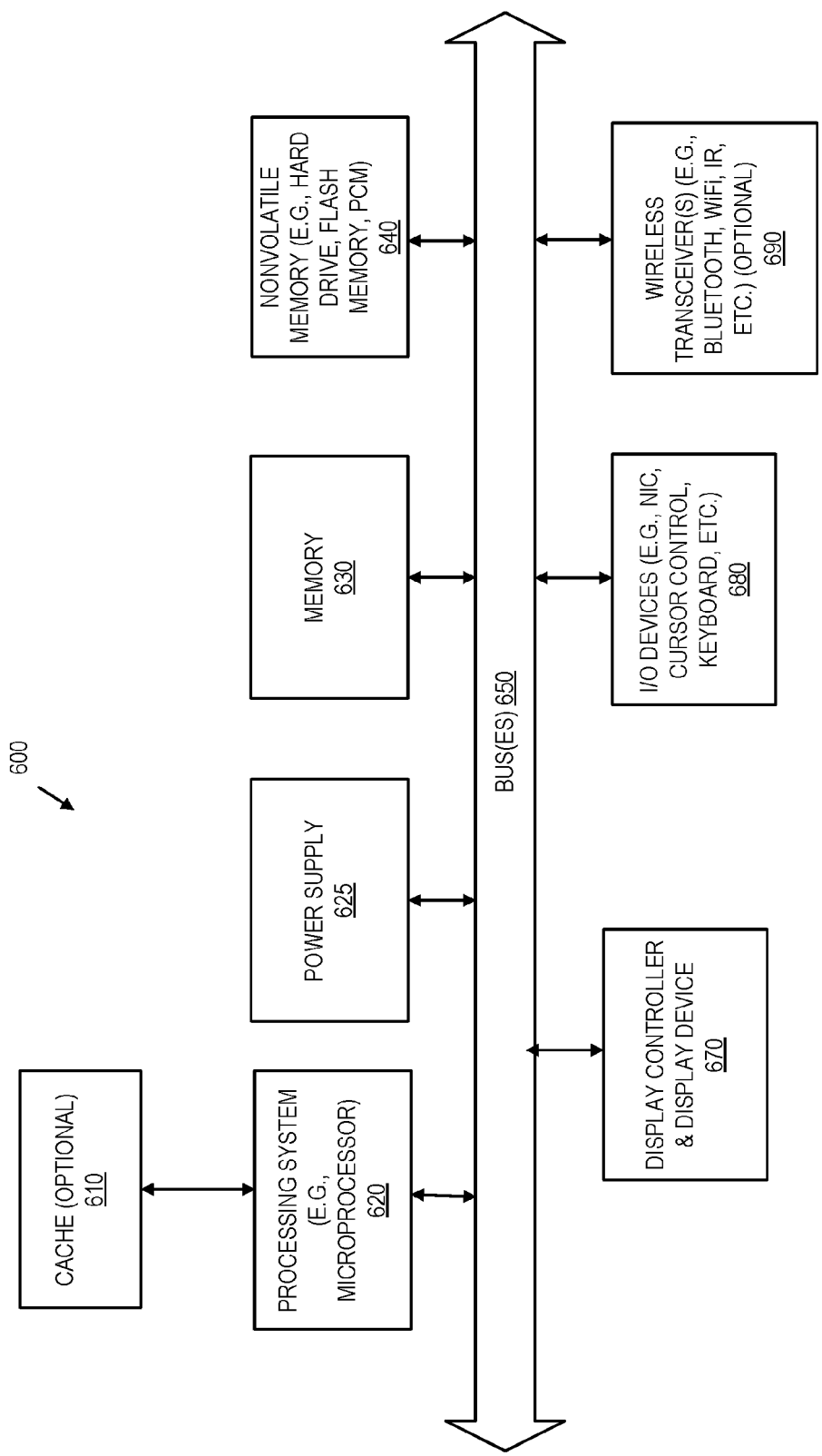
FIG. 6 illustrates a block diagram of an exemplary computer system that can be used for limiting traffic to an origin server in accordance with some embodiments.

FIG. 6 illustrates a block diagram of an exemplary computer system that can be used for limiting traffic to an origin server in accordance with some embodiments. The computer system 600, which is an electronic device, includes the bus(es) 650 which is coupled with the processing system 620, power supply 625, memory 630, and the nonvolatile memory 640 (e.g., a hard drive, flash memory, Phase-Change Memory (PCM), etc.). The bus(es) 650 may be connected to each other through various bridges, controllers, and/or adapters as is well known in the art. The processing system 620 may retrieve instruction(s) from the memory 630 and/or the nonvolatile memory 640, and execute the instructions to perform operations described herein. The bus 650 interconnects the above components together and also interconnects those components to the display controller & display device 670, Input/Output devices 680 (e.g., NIC (Network Interface Card), a cursor control (e.g., mouse, touchscreen, touchpad, etc.), a keyboard, etc.), and the optional wireless transceiver(s) 690 (e.g., Bluetooth, WiFi, Infrared, etc.). In one embodiment, the client device 110, the service server 125, the proxy server 120, and/or the origin servers 130 can take the form of the computer system 600 and perform the operations described with reference to FIGS. 1A-5.

The techniques shown in the figures can be implemented using code and data stored and executed on one or more electronic devices (e.g., a client device, a proxy server, an origin server, a service server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a proxy server of limiting a rate at which traffic is received at an origin server, the method comprising:
    receiving, from a client device, a first request for a resource at an origin server;
    transmitting, to the client device, a first response that includes a refresh instruction, a first refresh time, and a first cryptographic token that is not valid until a first predetermined time is reached, and wherein the refresh instruction is to cause the client device to request the resource after the first refresh time has elapsed;
    incrementing a value of a first counter;
    receiving as a result of the refresh instruction a second request for the resource from the client device, wherein the second request includes the first cryptographic token;
    determining that the first cryptographic token is not valid; and
    responsive to determining that the first cryptographic token is not valid, performing:
        (a) responsive to determining that a value of a second counter is strictly smaller than a maximum number of client devices that can access the origin server during a predetermined interval of time, transmitting a second response including the refresh instruction, a second refresh time, and a second cryptographic token that is not valid until a second predetermined time is reached, wherein the second predetermined time occurs earlier than the first predetermined time, incrementing the value of the second counter, and decrementing the value of the first counter,
        (b) responsive to determining that the value of the second counter is not strictly smaller than the maximum number of client devices that can access the origin server during a predetermined interval of time, transmitting a third response that includes the refresh instruction, the first refresh time, and the first cryptographic token,
        (c) receiving a third request for the resource from the client device, wherein the third request includes at least one of the first cryptographic token and the second cryptographic token,
        (d) repeating (a), (b) and (c) until receiving a request from the client device that includes at least one of the first cryptographic token and the second cryptographic token that is valid, and
        (e) responsive to determining that at least one of the first cryptographic token and the second cryptographic token is valid, fulfilling the third request.

2. The method of claim 1 further comprising:
    receiving a fourth request for the resource from the client device, wherein the fourth request includes a third cryptographic token;
    determining that the third cryptographic token is valid; and
    responsive to determining that the third cryptographic token is valid, fulfilling the fourth request.

3. The method of claim 1, wherein determining that the value of the second counter is strictly smaller than the maximum number of client devices that can access the origin server includes:
    determining a number of requests that are to be transmitted to the origin server as a result of validity of their respective cryptographic tokens; and
    determining a number of requests from one or more client devices that contributed to the value of the first counter and that can be assigned cryptographic tokens associated with the second counter, wherein the cryptographic tokens associated with the second counter are to become valid prior to any cryptographic tokens of requests associated with the first counter.

4. The method of claim 3, wherein transmitting the second response is performed in response to selecting the second request as part of a subset of requests from a set of requests received from client devices, wherein each request from the set of requests includes a cryptographic token associated with the first counter, and wherein the subset of requests includes the number of requests that can be assigned cryptographic tokens associated with the second counter.

5. The method of claim 3, wherein the number of requests is a moving average of number of requests that are to be transmitted to the origin server.

6. The method of claim 3, wherein the number of requests includes requests addressed to the origin server from client devices in one or more geographical locations.

7. The method of claim 1, wherein the first cryptographic token includes a time-based one time password and the first predetermined time.

8. The method of claim 1 further comprising receiving as input the maximum number of client devices that can access the origin server during the predetermined interval of time.

9. The method of claim 1, wherein the value of the first counter indicates a number of clients that have a cryptographic token that is to be valid at the first predetermined time.

10. The method of claim 9, wherein the value of the second counter indicates a number of clients that have a cryptographic token that is to be valid at the second predetermined time, wherein the second predetermined time occurs before the first predetermined time and the difference between the second predetermined time and the first predetermined time is the predetermined interval of time.

11. A proxy server for limiting a rate at which traffic is received at an origin server, the proxy server comprising:
    a non-transitory computer readable storage medium to store instructions; and
    a processor coupled with the non-transitory computer readable storage medium to process the stored instructions to:
        receive, from a client device, a first request for a resource at an origin server;
        transmit, to the client device, a first response that includes a refresh instruction, a first refresh time, and a first cryptographic token that is not valid until a first predetermined time is reached, and wherein the refresh instruction is to cause the client device to request the resource after the first refresh time has elapsed;

increment a value of a first counter;

receive as a result of the refresh instruction a second request for the resource from the client device, wherein the second request includes the first cryptographic token;

determine that the first cryptographic token is not valid; and responsive to determining that the first cryptographic token is not valid, perform:
 (a) responsive to determining that a value of a second counter is strictly smaller than a maximum number of client devices that can access the origin server during a predetermined interval of time, transmit a second response including the refresh instruction, a second refresh time, and a second cryptographic token that is not valid until a second predetermined time is reached, wherein the second predetermined time occurs earlier than the first predetermined time, increment the value of the second counter, and decrement the value of the first counter,
 (b) responsive to determining that the value of the second counter is not strictly smaller than the maximum number of client devices that can access the origin server during a predetermined interval of time, transmit a third response that includes the refresh instruction, the first refresh time, and the first cryptographic token,
 (c) receive a third request for the resource from the client device, wherein the third request includes at least one of the first cryptographic token and the second cryptographic token,
 (d) repeat (a), (b) and (c) until receiving a request from the client device that includes at least one of the first cryptographic token and the second cryptographic token that is valid, and
 (e) responsive to determining that at least one of the first cryptographic token and the second cryptographic token is valid, fulfil the third request.

12. The proxy server of claim 11, wherein the processor is further to:
receive a fourth request for the resource from the client device, wherein the fourth request includes a third cryptographic token;
determine that the third cryptographic token is valid; and
responsive to determining that the third cryptographic token is valid, fulfil the fourth request.

13. The proxy server of claim 11, wherein to determine that the value of the second counter is strictly smaller than the maximum number of client devices that can access the origin server includes to:
determine a number of requests that are to be transmitted to the origin server as a result of validity of their respective cryptographic tokens; and
determine a number of requests from one or more client devices that contributed to the value of the first counter and that can be assigned cryptographic tokens associated with the second counter, wherein the cryptographic tokens associated with the second counter are to become valid prior to any cryptographic tokens of requests associated with the first counter.

14. The proxy server of claim 13, wherein to transmit the second response is performed in response to selecting the second request as part of a subset of requests from a set of requests received from client devices, wherein each request from the set of requests includes a cryptographic token associated with the first counter, and wherein the subset of requests includes the number of requests that can be assigned cryptographic tokens associated with the second counter.

15. The proxy server of claim 13, wherein the number of requests is a moving average of number of requests that are to be transmitted to the origin server.

16. The proxy server of claim 13, wherein the number of requests includes requests addressed to the origin server from client devices in one or more geographical locations.

17. The proxy server of claim 11, wherein the first cryptographic token includes a time-based one time password and the first predetermined time.

18. The proxy server of claim 11, wherein the processor is further to receive as input the maximum number of client devices that can access the origin server during the predetermined interval of time.

19. The proxy server of claim 11, wherein the value of the first counter indicates a number of clients that have a cryptographic token that is to be valid at the first predetermined time.

20. The proxy server of claim 19, wherein the value of the second counter indicates a number of clients that have a cryptographic token that is to be valid at the second predetermined time, wherein the second predetermined time occurs before the first predetermined time and the difference between the second predetermined time and the first predetermined time is the predetermined interval of time.

21. A non-transitory computer readable storage medium that provide instructions, which when executed by a processor of a proxy server, cause said processor to perform operations comprising:
receiving, from a client device, a first request for a resource at an origin server;
transmitting, to the client device, a first response that includes a refresh instruction, a first refresh time, and a first cryptographic token that is not valid until a first predetermined time is reached, and wherein the refresh instruction is to cause the client device to request the resource after the first refresh time has elapsed;
incrementing a value of a first counter;
receiving as a result of the refresh instruction a second request for the resource from the client device, wherein the second request includes the first cryptographic token;
determining that the first cryptographic token is not valid; and
responsive to determining that the first cryptographic token is not valid, performing:
 (f) responsive to determining that a value of a second counter is strictly smaller than a maximum number of client devices that can access the origin server during a predetermined interval of time, transmitting a second response including the refresh instruction, a second refresh time, and a second cryptographic token that is not valid until a second predetermined time is reached, wherein the second predetermined time occurs earlier than the first predetermined time, incrementing the value of the second counter, and decrementing the value of the first counter,
 (g) responsive to determining that the value of the second counter is not strictly smaller than the maximum number of client devices that can access the origin server during a predetermined interval of time, transmitting a third response that includes the refresh instruction, the first refresh time, and the first cryptographic token,
(h) receiving a third request for the resource from the client device, wherein the third request includes at least one of the first cryptographic token and the second cryptographic token,
(i) repeating (a), (b) and (c) until receiving a request from the client device that includes at least one of the first cryptographic token and the second cryptographic token that is valid, and
(j) responsive to determining that at least one of the first cryptographic token and the second cryptographic token is valid, fulfilling the third request.

22. The non-transitory computer readable storage medium of claim 21, wherein the operations further comprise:
receiving a fourth request for the resource from the client device, wherein the fourth request includes a third cryptographic token;
determining that the third cryptographic token is valid; and
responsive to determining that the third cryptographic token is valid, fulfilling the fourth request.

23. The non-transitory computer readable storage medium of claim 21, wherein determining that the value of the second counter is strictly smaller than the maximum number of client devices that can access the origin server includes:
determining a number of requests that are to be transmitted to the origin server as a result of validity of their respective cryptographic tokens; and
determining a number of requests from one or more client devices that contributed to the value of the first counter and that can be assigned cryptographic tokens associated with the second counter, wherein the cryptographic tokens associated with the second counter are to become valid prior to any cryptographic tokens of requests associated with the first counter.

24. The non-transitory computer readable storage medium of claim 23, wherein transmitting the second response is performed in response to selecting the second request as part of a subset of requests from a set of requests received from client devices, wherein each request from the set of requests includes a cryptographic token associated with the first counter, and wherein the subset of requests includes the number of requests that can be assigned cryptographic tokens associated with the second counter.

25. The non-transitory computer readable storage medium of claim 23, wherein the number of requests is a moving average of number of requests that are to be transmitted to the origin server.

26. The non-transitory computer readable storage medium of claim 23, wherein the number of requests includes requests addressed to the origin server from client devices in one or more geographical locations.

27. The non-transitory computer readable storage medium of claim 21, wherein the first cryptographic token includes a time-based one time password and the first predetermined time.

28. The non-transitory computer readable storage medium of claim 21, wherein the operations further comprise receiving as input the maximum number of client devices that can access the origin server during the predetermined interval of time.

29. The non-transitory computer readable storage medium of claim 21, wherein the value of the first counter indicates a number of client devices that have been issued a cryptographic token that is to be valid at the first predetermined time.

30. The non-transitory computer readable storage medium of claim 29, wherein the value of the second counter indicates a number of clients that have a cryptographic token that is to be valid at the second predetermined time, wherein the second predetermined time occurs before the first predetermined time and the difference between the second predetermined time and the first predetermined time is the predetermined interval of time.

* * * * *